United States Patent Office 2,812,142
Patented Nov. 5, 1957

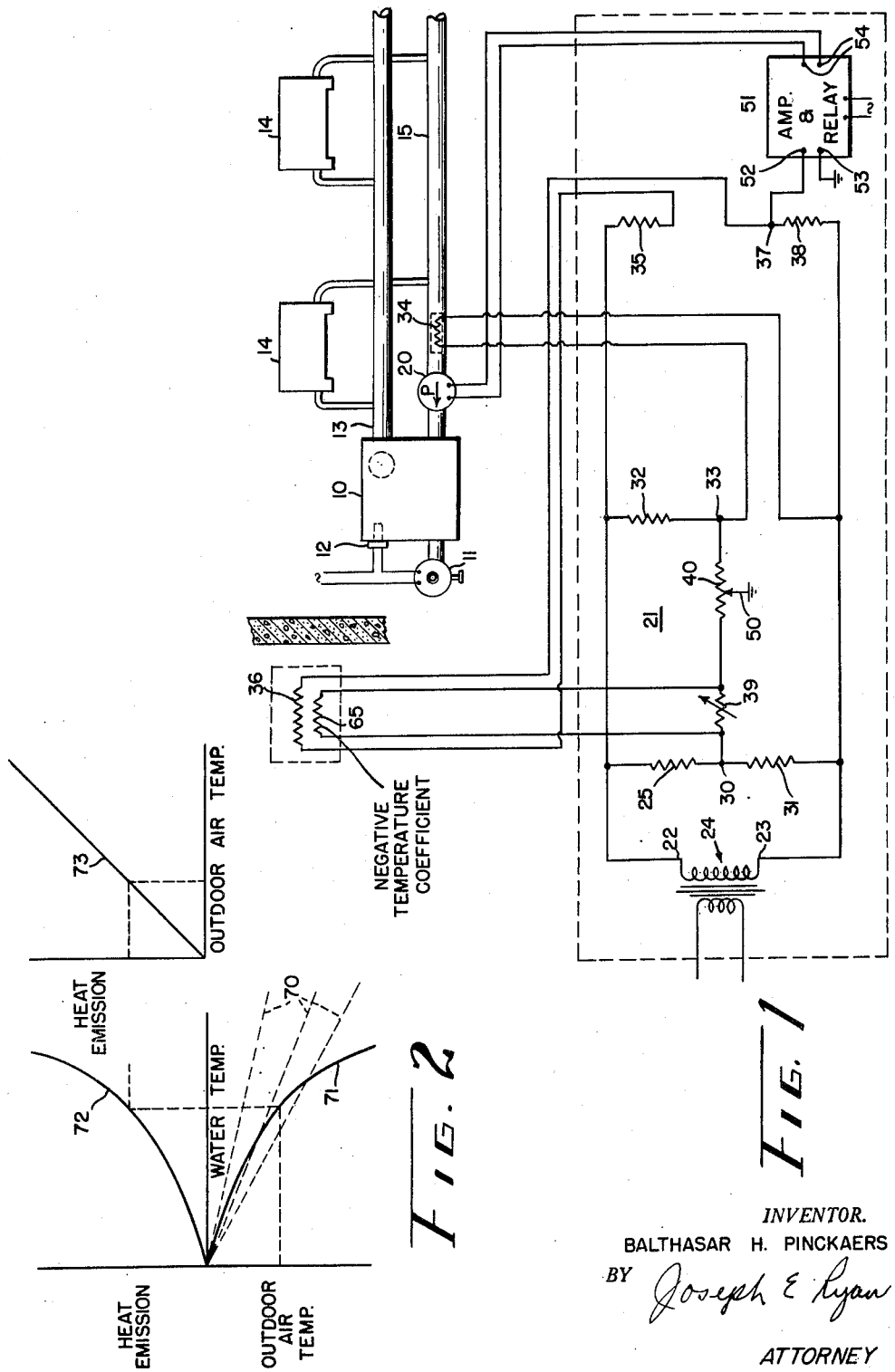

2,812,142

HOT WATER HEATING CONTROL SYSTEM WITH NON-LINEAR WATER TEMPERATURE CONTROL

Balthasar H. Pinckaers, Hopkins, Minn., assignor to Minneapolis-Honeywell Regulator Company, Minneapolis, Minn., a corporation of Delaware Application November 3, 1954, Serial No. 466,620

5 Claims. (Cl. 236—91)

The present invention is concerned with an improvement in apparatus for controlling the source of heat to a dwelling or building in response to outdoor temperature, in particular, in a heating installation in which hot water is circulated through the building, the temperature of the water being scheduled so that the heat emission of the radiators, that is the heat delivered to the building, has a linear relation with the outdoor temperature.

In heating installations, more specially hot water systems in which hot water is circulated from a furnace to radiators in the building, the temperature of the water is normally scheduled depending upon the temperature or weather conditions outside of the building. In electronic apparatus, a bridge circuit is used having a temperature responsive element in the return water pipe and a temperature responsive element located outside, the relationship between these elements as it effects the operation of the heat source or the circulator pump is maintained to provide a linear relation between the water temperature and the outdoor air temperature. The relationship between the outdoor element and the return water element in the bridge circuit is adjusted depending on the heating load of the building, that is the slope of the water temperature versus outdoor temperature characteristic line is changed for any particular installation.

It has been found that to match a heating installation to the building requirements the water temperature versus outdoor air temperature characteristic must be other than a linear relationship as the heat emission or B. t. u. output of the radiators does not vary linearly with the water temperature and to more closely design the heating installation for the building requirements the heat emission to the building must be linear with outdoor temperature. The present invention provides for a variable ratio adjustment between the outdoor element and the water temperature element so that as the outdoor temperature goes down the water temperature is increased at a rate to provide for linear heat emission to the building from the various radiators as a function of the outdoor temperature. In particular, this is done by placing a negative temperature coefficient resistance element in the bridge circuit, this element being responsive to the temperature of outdoor air.

It is therefore an object of the present invention to provide an improved control apparatus for scheduling the output of a condition changing device.

Another object of the present invention is to provide an improved temperature control apparatus for scheduling the heat supplied to a building as a linear function of the outdoor temperature.

Another object of the present invention is to provide in a bridge circuit of a temperature control apparatus for controlling the source of heat to a building a novel means of having a linear relation between the outdoor temperature and the heat delivery to the building, it comprising the use of a negative temperature coefficient resistance element responsive to outdoor temperature in addition to the normal outdoor element of the bridge circuit.

These and other objects of the present invention will become apparent upon a reading of the specification and drawings of which Figure 1 is a schematic drawing of the bridge circuit showing its application to one particular type of heating installation;

Figure 2 is a graphical representation to show how a linear relation is obtained between the heat emission and the outdoor temperature.

Referring to Figure 1 a conventional hot water heating system is shown schematically having a furnace 10 receiving heat from a burner 11 connected to a source of power through a controller 12 for maintaining a predetermined water temperature in the furnace. Water is circulated from the furnace through a riser 13 to which various radiators 14 are connected, the water returning from the radiators to the furnace through a return pipe 15 containing a circulator pump 20.

A bridge circuit 21 has a plurality of branch circuits connected to end terminals 22 and 23 of a source of power 24. A first of said branch circuits contains a resistor 25, a tap 30, and a resistor 31. A second branch circuit contains a resistor 32, a tap 33, and a temperature responsive resistance element 34 placed in the return water pipe 15 to be responsive to the temperature of the return water. A third branch circuit comprises a resistor 35, a second temperature responsive resistance element 36 placed outside the building to be responsive to the temperature of the outdoor air, a tap 37, and a resistor 38. Connected in a series circuit between taps 30 and 33 is a resistor 39 and a resistor 40 having a movable wiper 50 thereon that is connected to ground, respectively.

An amplifier relay 51 of a type shown and described in a copending application, Jenkins et al. Serial No. 378,196, filed September 3, 1953, has an input terminal 52 connected to tap 37. A second input terminal 53 is connected to ground. Output terminals 54 of amplifier relay 51 supply power to pump 20 whenever a signal to its input terminals from bridge circuit 21 is of a predetermined value.

The control apparatus as described is substantially the same as that disclosed in the Jenkins et al. application previously mentioned. The effect of the temperature responsive element 36 and 34 in the bridge circuit 21 is such to provide for operation of the circulator pump 20 to maintain a predetermined return water temperature in pipe 15 depending upon the outdoor air temperature. Thus as the outdoor air temperature goes down, element 36 effectively unbalances the bridge circuit to provide an input signal to amplifier relay 51 causing energization of circulator pump 20 until the temperature of the return water and thus element 34 is such to bring the bridge back to a balance or "null" condition, this shutting off the pump 20. The relationship or ratio of the effectiveness of elements 36 and 34 in bridge circuit 20 is adjusted by wiper 50 and with the wiper to the far right extremity on resistor 40, the ratio would be approximately unity. With this bridge circuit arrangement a linear relation is maintained between the water temperature and the outdoor air temperature.

Connected in parallel with resistor 39 is a negative temperature coefficient resistance element 65 also located outside to be responsive to the temperature of the outdoor air. Elements 36 and 65 obviously could be mounted together in the same container. Resistor 39 has a value which is selected to match the particular negative temperature coefficient element 60 and obviously could be variable for calibration purposes.

Referring to Figure 2 a first graphical representation shows the characteristic curve of heat emission versus water temperature and outdoor air temperature versus water temperature. The bridge circuit of the Jenkins et al. application, that is bridge circuit 21 without the negative temperature coefficient resistance element 65 connected in parallel with resistor 39, would provide a water temperature versus outdoor air temperature characteristic as shown by the dotted lines 70, the slope being determined by the position of movable wiper 50. With the element 65 connected in the bridge circuit the resistance between terminals 30 and 33 would increase as the temperature of the outside air decreased thus the current flow through the circuit between taps 30 and 33 for a predetermined voltage level at each of the taps would decrease and the drop across that portion of resistor 40 between tap 33 and ground would change to effectively vary the ratio between elements 34 and 36. The ultimate effect of the negative temperature coefficient resistance element 65 is to provide an outdoor air temperature versus water temperature characteristic line shown as 71.

As the heat emission or B. t. u. output of the radiators in the building is found to vary as a function of radiator water temperature along a line substantially as shown in the graph of Figure 2. With the nonlinear water temperature as shown by curve 71 and the nonlinear heat emission characteristic as shown by characteristic curve 72, the result of heat emission to the building as a function of outdoor temperature is substantially linear as shown by line 73. This can be graphically plotted by selecting an outdoor air temperature on the ordinate of the first shown graph and following that temperature horizontally to the right to curve 71. From the intersection point of curve 71 draw a line vertically to intersect with curve 72, this is the heat emission for that selected outdoor temperature, and can be plotted on another graph using the same scale for the outdoor air temperature on the abscissa to result in a heat emission versus outdoor air temperature characteristic line 73.

*Operation*

As shown in Figure 1, the water temperature in furnace 10 would be maintained at some selected value and once this water temperature is at that value controller 12 would deenergize burner 11. For a particular outdoor air temperature a selected water temperature in pipe 15 would be maintained as determined by the position of wiper 50. Should the temperature of the water or element 34 drop below that value the bridge would be unbalanced to an extent to provide an input signal to terminal 52 to cause operation of pump 20.

Whenever the temperature outside and thus the temperature of elements 36 and 65 drop to some lower value the relationship of elements 34 and 36, when wiper 50 was at some position along resistor 40, would change so that the water temperature maintained in the return pipe 15 would increase thus the heat emission or heat output of radiators 14 to the building would rise. Should wiper 50 be positioned to the far right extremity on resistor 40 the ratio of elements 34 to 36 in the bridge circuit would be a minimum and element 65 would have no effect in changing this ratio as the outdoor temperature varies. Element 65 changes the resistance between taps 30 and 33 to increase current flow and thus the voltage drop across the portion of resistor 40 between tap 33 and ground 50 as the outdoor air temperature goes up. This in effect varies the ratio of outdoor air temperature to water temperature so that a substantially linear relation of heat output to the building is maintained as a function of the outdoor air temperature. Such a relationship between heat output and outdoor temperature provides for better temperature control of the building as the temperature losses of such a building vary proportionally to the outdoor air temperature neglecting the effect of other weather conditions such as the effect of sun and wind.

While the present invention has been shown and described as it applies to a circulated hot water heating installation, it is obvious that it could be used with other types of conditioning control devices, therefore it is intended that the invention only be limited by the scope of the appended claims of which I claim:

1. In temperature control apparatus for scheduling the temperature of a medium in a heating system in response to the outdoor temperature: bridge network circuit means comprising a source of power to which is connected a plurality of branch circuits, a first branch circuit including a positive temperature responsive element responsive to the outdoor temperature and a first tap, a second branch circuit including a second tap and a second positive temperature responsive element responsive to the temperature of the medium, and a third branch circuit including a third tap and a plurality of resistors; a negative temperature coefficient temperature responsive element, said element being responsive to outdoor temperature; connection means including said negative coefficient element and a resistor with a movable wiper thereon connecting said second and third taps, said movable wiper being connected to ground; relay amplifier means having its input circuit connected to respond to an output between said first tap and ground; heat furnishing means for heating said medium; and connection means connecting said relay amplifier means in controlling relation to said heat furnishing means.

2. In temperature control apparatus for controlling the supply of heat from a heat furnishing device in response to outdoor temperature: network circuit means having a plurality of parallel branch circuits connected to a source of power, a first branch circuit including temperature responsive impedance means, said temperature responsive means being responsive to outdoor temperature, a second branch circuit including second temperature responsive impedance means, said second temperature responsive means being responsive to the temperature of the heat furnishing device, and a third branch circuit; third temperature responsive impedance means responsive to outdoor temperature, said third means having an impedance versus temperature characteristic opposite of said first and second means, an output terminal, circuit connection means including said terminal and said third temperature responsive means connecting said second and third branch circuits; and relay means having an input circuit and an output circuit, said input being connected to said first branch circuit and said terminal, said output circuit being connected to the heat furnishing device.

3. In temperature control apparatus for controlling a source of heat for a building in response to outdoor conditions; bridge circuit means having a plurality of legs, a temperature responsive element responsive to outdoor temperature connected to one of said legs and a second temperature responsive element responsive to the temperature of the source of heat connected in a second of said legs, a third temperature responsive element having a negative resistance versus temperature characteristic and being responsive to outdoor temperature, said element being connected between said second leg and still another leg, the resistance of which is effective to vary the relative effects of said first temperature responsive element and said second temperature responsive element as outdoor temperature changes; and relay means for controlling the source of heat, said relay means being connected in a manner to be controlled by said bridge circuit means.

4. In control apparatus for controlling a conditioning changing device; circuit means comprising a plurality of parallel branches connected to a source of power, a first branch including first condition responsive impedance means responsive to a first condition, a second branch including second condition responsive impedance means responsive to a second condition, third condition responsive impedance means responsive to said second condition, an output terminal, a third branch circuit connected across said source, connection means including said third responsive means and said terminal for connecting said second branch to said third branch circuit, said third responsive means being effective to change the relationship of said first and second responsive means, relay means connected to said first branch circuit and said terminal and being responsive to the output therefrom, said relay means being adapted to control the condition changing device.

5. In control apparatus for controlling a conditioning changing device; circuit means comprising a plurality of branches connected to a source of power, a first branch including first condition responsive means responsive to a first condition, a second branch including second condition responsive means responsive to a second condition, third condition responsive means responsive to said second condition, said third responsive means having a negative characteristic as compared with said first and second condition responsive means, an output terminal, connection means including said third responsive means and said terminal for connecting said second branch to a third branch circuit, relay means connected to said first branch circuit and said terminal and being responsive to the output therefrom, said relay means being adapted to control the condition changing device.

References Cited in the file of this patent

UNITED STATES PATENTS

| | | |
|---|---|---|
| 2,603,422 | Sargeaunt | July 15, 1952 |
| 2,661,906 | Stahlberg | Dec. 8, 1953 |

FOREIGN PATENTS

| | | |
|---|---|---|
| 573,028 | Great Britain | Nov. 2, 1945 |

OTHER REFERENCES

The American Society of Heating and Ventilating Engineers Guide, 1931, pages 184–186, published at 51 Madison Avenue, New York, N. Y.